United States Patent
Harris

(10) Patent No.: US 9,255,524 B2
(45) Date of Patent: Feb. 9, 2016

(54) VARIABLE OUTER AIR SEAL FLUID CONTROL

(71) Applicant: United Technologies Corporation, Hartford, CT (US)

(72) Inventor: Meggan Harris, Colchester, CT (US)

(73) Assignee: United Technologies Corporation, Hartford, CT (US)

( * ) Notice: Subject to any disclaimer, the term of this patent is extended or adjusted under 35 U.S.C. 154(b) by 665 days.

(21) Appl. No.: 13/721,369

(22) Filed: Dec. 20, 2012

(65) Prior Publication Data

US 2014/0212276 A1   Jul. 31, 2014

(51) Int. Cl.
| | |
|---|---|
| *F04D 27/02* | (2006.01) |
| *F02C 7/28* | (2006.01) |
| *F01D 11/10* | (2006.01) |
| *F01D 11/22* | (2006.01) |
| *F01D 11/24* | (2006.01) |

(52) U.S. Cl.
CPC . *F02C 7/28* (2013.01); *F01D 11/10* (2013.01); *F01D 11/22* (2013.01); *F01D 11/24* (2013.01)

(58) Field of Classification Search
CPC ......... F01D 25/24; F01D 25/08; F01D 25/10; F01D 25/12; F01D 25/14; F01D 11/22; F01D 11/24; F01D 11/20; F01D 11/10; F01D 11/14; F01D 11/08; F01D 11/02; F02C 7/28

USPC ....................................................... 415/173.2
See application file for complete search history.

(56) References Cited

U.S. PATENT DOCUMENTS

| | | |
|---|---|---|
| 5,609,469 A | 3/1997 | Worley et al. |
| 7,032,835 B2 | 4/2006 | Murphy et al. |
| 7,665,961 B2 | 2/2010 | Lutjen et al. |
| 2004/0071548 A1 | 4/2004 | Wilson, Jr. |
| 2008/0159850 A1 | 7/2008 | Tholen et al. |
| 2009/0110546 A1 | 4/2009 | Tholen et al. |
| 2011/0044804 A1 | 2/2011 | Dipaola et al. |
| 2011/0293407 A1 | 12/2011 | Wagner |

OTHER PUBLICATIONS

International Search Report and Written Opinion for International Application No. PCT/US2013/071411 completed on Mar. 4, 2014.
International Preliminary Report on Patentability for International Application No. PCT/US2013/071411 mailed Jul. 2, 2015.
U.S. Appl. No. 13/495,454, filed Jun. 13, 2012.

*Primary Examiner* — Edward Look
*Assistant Examiner* — Jason Mikus
(74) *Attorney, Agent, or Firm* — Carlson, Gaskey & Olds, P.C.

(57) ABSTRACT

An example turbomachine system includes a first variable outer air seal including at least one channel. The first variable outer air seal configured to selectively communicate a fluid in response to movement of a second variable outer air seal relative to the first variable outer air seal. An example fluid control method includes selectively covering a channel inlet using a variable outer air seal to control flow through the channel.

13 Claims, 5 Drawing Sheets

VARIABLE OUTER AIR SEAL FLUID CONTROL

BACKGROUND

This disclosure relates to a blade outer air seal (BOAS) assembly for a turbomachine and, more particularly, to a BOAS assembly having segments that are moved relative to each other to selectively communicate fluid.

Turbomachines, such as gas turbine engines, typically include a fan section, a compression section, a combustion section, and a turbine section. Turbomachines may employ a geared architecture connecting portions of the compression section to the fan section.

BOAS circumscribe arrays of blades in the compression section, turbine section, or both. Turbomachines have developed passive and active systems for controlling clearances of the gap between the outer air seal and the tip of the turbine blade. Significant and varied thermal energy levels may be concentrated in these areas. Cooling these areas is often difficult. Specific and dedicated components are used to provide flow and cooling, which adds weight and cost.

SUMMARY

A turbomachine system according to an exemplary aspect of the present disclosure includes, among other things, a first variable outer air seal including at least one channel. The first variable outer air seal is configured to selectively communicate fluid in response to movement of a second variable outer air seal relative to the first variable outer air seal.

In a further non-limiting embodiment of the foregoing turbomachine system, the at least one channel may extend from a radially outward facing surface to a radially inward facing surface.

In a further non-limiting embodiment of either of the foregoing turbomachine systems, the at least one channel may extend to a circumferentially facing surface.

In a further non-limiting embodiment of any of the foregoing turbomachine systems, the first and second variable outer air seal may be circumferentially adjacent.

In a further non-limiting embodiment of any of the foregoing turbomachine systems, the at least one channel has an inlet, and the second variable outer air seal may move relative to inlet between positions that permit flow through the inlet and positions that limit flow through the inlet to selectively communicate flow.

In a further non-limiting embodiment of any of the foregoing turbomachine systems, the first variable outer air seal may include an inclined surface, and the second variable outer air seal may move across the inclined surface to selectively communicate fluid.

In a further non-limiting embodiment of any of the foregoing turbomachine systems, the first and second variable outer air seals may have a shiplapped configuration.

In a further non-limiting embodiment of any of the foregoing turbomachine systems, the first and second variable outer air seals may be moveable relative to each other between a first position and a second position to selectively control fluid flow through at least one channel. The first and second variable outer air seals may circumferentially overlap each other when in the first position more than when in the second position.

In a further non-limiting embodiment of any of the foregoing turbomachine systems, the fluid may be cooling air.

In a further non-limiting embodiment of any of the foregoing turbomachine systems, the first and second variable outer air seals are blade outer air seals.

A method of turbomachine fluid control according to another exemplary aspect of the present disclosure includes, among other things, selectively covering a channel inlet using a variable outer air seal to control flow through the channel.

In a further non-limiting embodiment of the foregoing method of turbomachine fluid control, the channel may be a cooling channel.

In a further non-limiting embodiment of either of the foregoing methods of turbomachine fluid control, the variable outer air seal is a first outer air seal, and the channel may be provided by a second variable outer air seal.

In a further non-limiting embodiment of any of the foregoing methods of turbomachine fluid control, the variable outer air seal is a first outer air seal, and a second outer air seal may selectively cover the channel inlet to control flow through the channel.

A method of turbomachine fluid control according to yet another exemplary aspect of the present disclosure includes, among other things, moving a first variable outer air seal relative to a second variable outer air seal to control flow of a cooling fluid.

In a further non-limiting embodiment of the foregoing method of turbomachine fluid control, the moving may comprise moving the first and second variable outer air seals circumferentially relative to each other.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
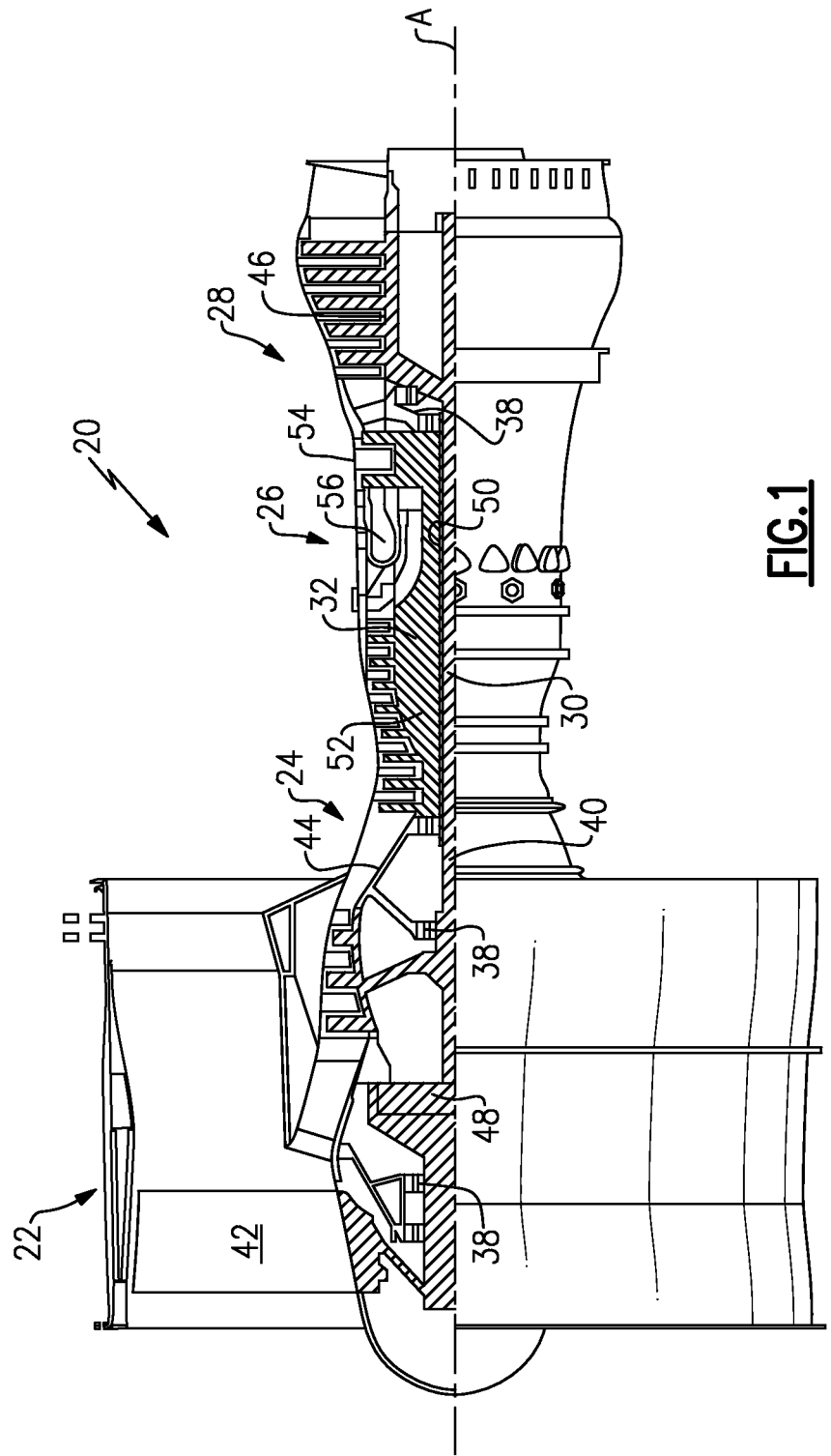
FIG. 1 is a cross-sectional view of an example turbomachine.

FIG. 1 schematically illustrates an example turbomachine, which is a gas turbine engine 20 in this example. The gas turbine engine 20 is a two-spool turbofan gas turbine engine that generally includes a fan section 22, a compression section 24, a combustion section 26, and a turbine section 28.

Although depicted as a two-spool turbofan gas turbine engine in the disclosed non-limiting embodiment, it should be understood that the concepts described herein are not limited to use with turbofans. That is, the teachings may be applied to other types of turbomachines and turbine engines including three-spool architectures. Further, the concepts described herein could be used in environments other than a turbomachine environment and in applications other than aerospace applications.

In the example engine 20, flow moves from the fan section 22 to a bypass flowpath. Flow from the bypass flowpath generates thrust. The compression section 24 drives air along a core flowpath. Compressed air from the compression section 24 communicates through the combustion section 26. The products of combustion expand through the turbine section 28.

The example engine 20 generally includes a low-speed spool 30 and a high-speed spool 32 mounted for rotation about an engine central axis A. The low-speed spool 30 and the high-speed spool 32 are rotatably supported by several bearing systems 38. It should be understood that various bearing systems 38 at various locations may alternatively, or additionally, be provided.

The low-speed spool 30 generally includes a shaft 40 that interconnects a fan 42, a low-pressure compressor 44, and a low-pressure turbine 46. The shaft 40 is connected to the fan 42 through a geared architecture 48 to drive the fan 42 at a lower speed than the low-speed spool 30.

The high-speed spool 32 includes a shaft 50 that interconnects a high-pressure compressor 52 and high-pressure turbine 54.

The shaft 40 and the shaft 50 are concentric and rotate via bearing systems 38 about the engine central longitudinal axis A, which is collinear with the longitudinal axes of the shaft 40 and the shaft 50.

The combustion section 26 includes a circumferentially distributed array of fuel nozzles within an annular combustor 56 that is generally arranged axially between the high-pressure compressor 52 and the high-pressure turbine 54.

In some non-limiting examples, the engine 20 is a high-bypass geared aircraft engine. In a further example, the engine 20 bypass ratio is greater than about six (6 to 1).

The geared architecture 48 of the example engine 20 includes an epicyclic gear train, such as a planetary gear system or other gear system. The example epicyclic gear train has a gear reduction ratio of greater than about 2.3 (2.3 to 1).

The low-pressure turbine 46 pressure ratio is pressure measured prior to inlet of low-pressure turbine 46 as related to the pressure at the outlet of the low-pressure turbine 46 prior to an exhaust nozzle of the engine 20. In one non-limiting embodiment, the bypass ratio of the engine 20 is greater than about ten (10 to 1), the fan diameter is significantly larger than that of the low-pressure compressor 44, and the low-pressure turbine 46 has a pressure ratio that is greater than about 5 (5 to 1). The geared architecture 48 of this embodiment is an epicyclic gear train with a gear reduction ratio of greater than about 2.5 (2.5 to 1). It should be understood, however, that the above parameters are only exemplary of one embodiment of a geared architecture engine and that the present disclosure is applicable to other gas turbine engines including direct drive turbofans.

In this embodiment of the example engine 20, a significant amount of thrust is provided by the bypass flow due to the high bypass ratio. The fan section 22 of the engine 20 is designed for a particular flight condition—typically cruise at about 0.8 Mach and about 35,000 feet. This flight condition, with the engine 20 at its best fuel consumption, is also known as "Bucket Cruise" Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example engine 20 is less than 1.45 (1.45 to 1).

"Low Corrected Fan Tip Speed" is the actual fan tip speed in ft/sec divided by an industry standard temperature correction of $[(\text{Tram }°\text{R})/(518.7°\text{R})]^{0.5}$. The Temperature represents the ambient temperature in degrees Rankine. The Low Corrected Fan Tip Speed according to one non-limiting embodiment of the example engine 20 is less than about 1150 fps (351 m/s).

Figure 2:
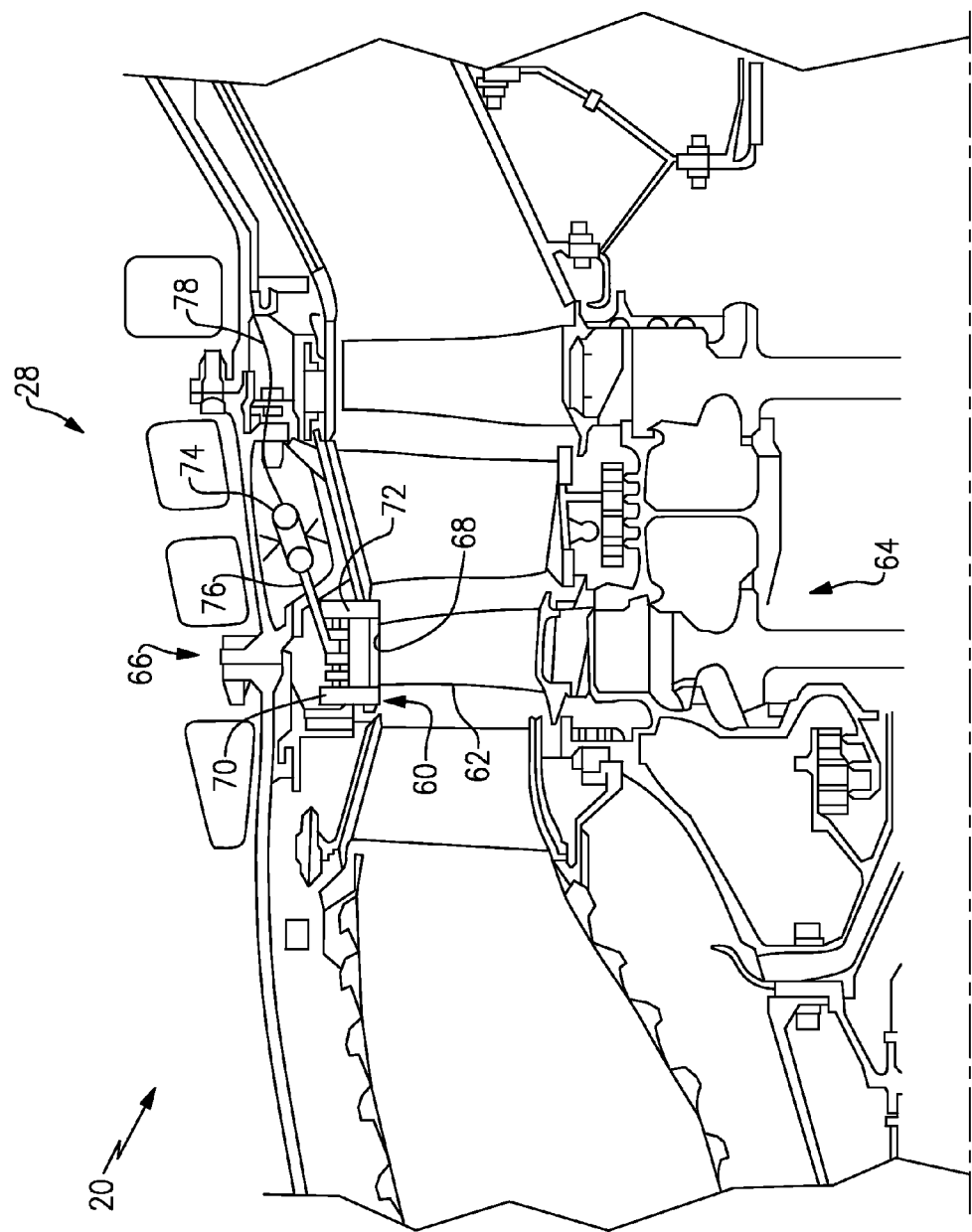
FIG. 2 shows a cross-sectional view of the high-pressure turbine of the turbomachine of FIG. 1.
Figure 3:
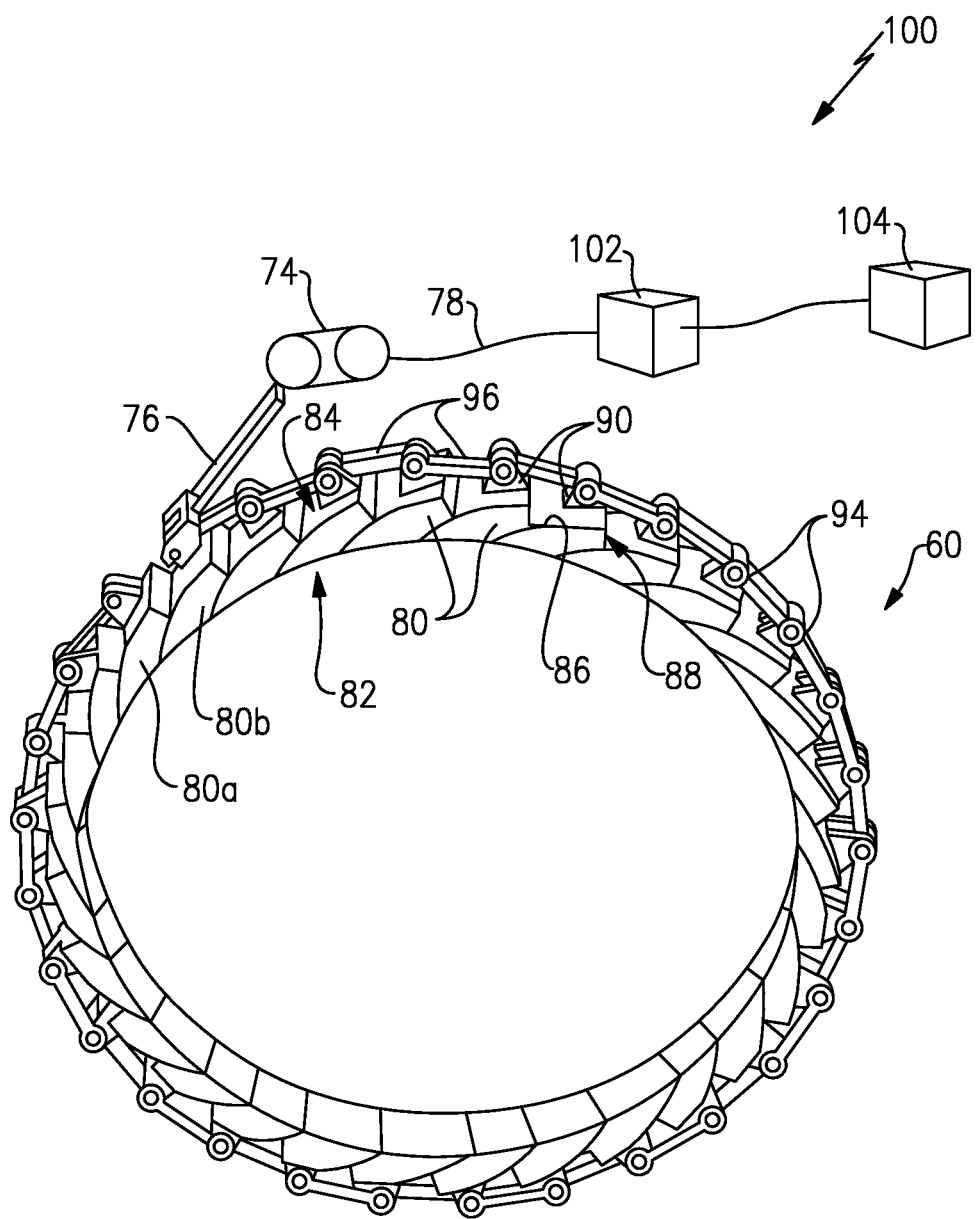
FIG. 3 shows a perspective view of a variable area outer air seal fluid control system.
Figure 4:
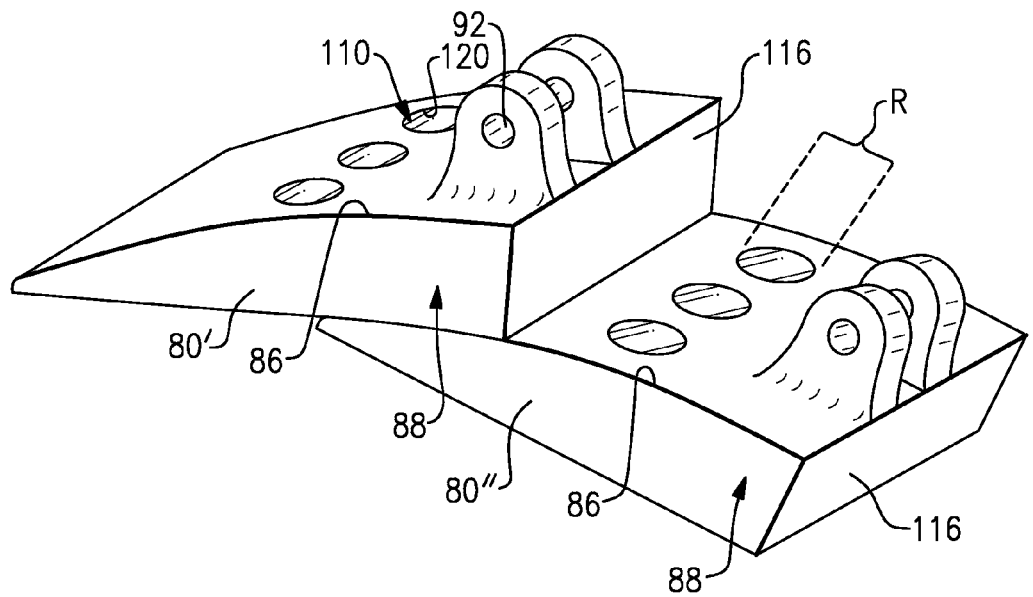
FIG. 4 shows a close up view of two variable area outer air seals of the system of FIG. 3 in a first position.

Referring to FIGS. 2 to 4, the turbine section 28 of the engine 20 includes a blade outer air seal ("BOAS") assembly 60 disposed between a plurality of circumferentially distributed rotor blades 62 of a rotor stage 64, and an annular outer engine case 66. In one embodiment, the BOAS 60 is adapted to limit air leakage between blade tips 68 and the engine case 66. The example BOAS 60 is supported by rails 70 and 72 attached to the engine case 66. BOAS 60 is also connected to an actuator 74 through a rod 76. The actuator 74 may connect to a main digital control. In some examples, the actuator 74 may be wired to a control system via a cable 78. In other examples, the actuator 74 attaches the main digital electronic control of the engine 20 in another ways.

The BOAS 60 includes multiple variable outer air seal segments 80 distributed annularly about the axis A. In this example, each segment has radially inwardly facing surfaces 82 and radially outwardly facing surfaces 84. The segments 82 each include an inclined surface 86 attached to a base portion 88. The inclined surface 86 is one of the radially outwardly facing surfaces 84 in this example. An extension 90 extends radially outward from the base portion 88. The extension 90 may be a stanchion, tab, lug, or some other structure. The extension 90 has an aperture 92 for receiving a connector pin 94.

Each segment 80 is connected to a circumferentially adjacent segment through a link 96 attached with the pin 94. Some of the segments, 80a and 80b are attached to a single circumferentially adjacent segment 80. Segment 80b is attached to the actuating rod 76. Actuating rod 76 is directly coupled to the actuator 74. Actuator 74 is attached to a control system 100 via the cable 78.

The control system 100, in this example, includes a sensor 102, for example a thermocouple, which may be positioned to sense a gas path temperature at a particular location along a core flow path of the engine. In one example, the sensor 102 extends through a turbine case to measure a temperature approximate location T4 at the entrance to the high-pressure turbine section, where airfoils and other components are particularly susceptible to thermal damage due to peaking gas temperatures. In another example, temperature sensor 102 may be positioned approximate another stage of the high-pressure turbine 54, or within the low-pressure turbine 46, or a compression section 24. In other examples, a number of temperature probes are positioned in different locations within the engine 20 to measure multiple gas path temperatures along flowpaths of the engine 20.

The control system 100 includes a flight controller 104 having a flight condition module, a thrust control, and other related engine functions. Depending on the embodiment, the flight controller 104 may comprise additional flight, engine, and navigational systems utilizing other control, sensor, and processor components located throughout the engine 20, and in other regions of the engine.

Flight controller 104 includes a combination of software and hardware components configured to determine and report flight conditions relevant to the operation of engine 20. In general, flight controller 104 includes a number of individual flight modules, which determine a range of different flight conditions based on a combination of pressure, temperature and spool speed measurements and additional data such as attitude and control surface positions.

Flight controller 104 may include a control law (CLW) configured to direct actuator 74 to adjust the modulated BOAS 60. The CLW directs actuator 74 based on the sensed inputs from sensor 102, the flight conditions determined by flight module, and other parameters, such as core flow gas path temperatures TC.

The flight controller 104 may direct the actuator 74 to adjust rod 76 in order to regulate the gap between the blade tips and radially inward facing surfaces 82 of the segments 80. The linkage design connected to modulated BOAS 60 is designed such that if pushed in one direction, linkages are pulled in tension, thus increasing the diameter of the modulated BOAS 60, while movement in the other direction creates compression within the linkages and decreases the overall diameter of modulated BOAS 60.

Figure 5:
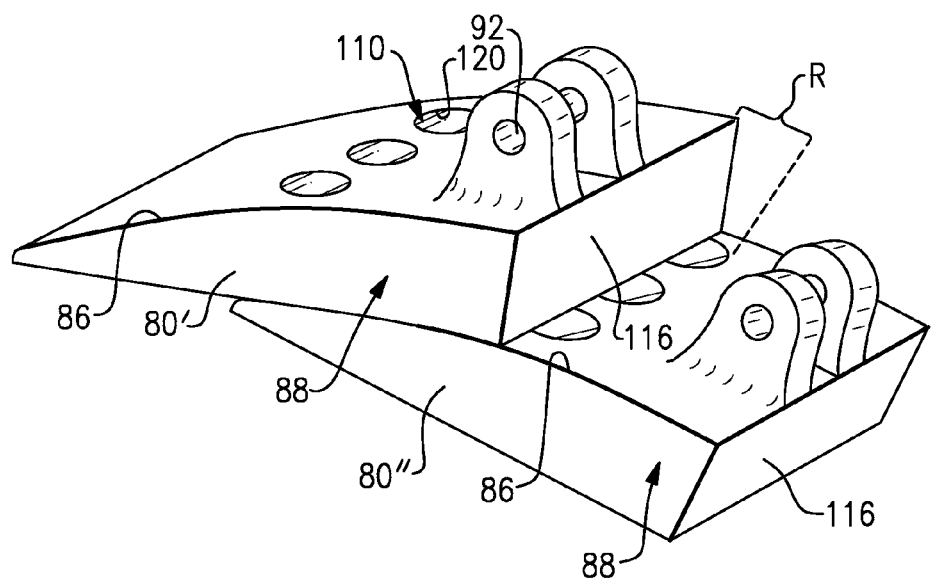
FIG. 5 shows the two variable area outer air seals of FIG. 4 in second position where the seals are more overlapped than when in the first position.
Figure 6:
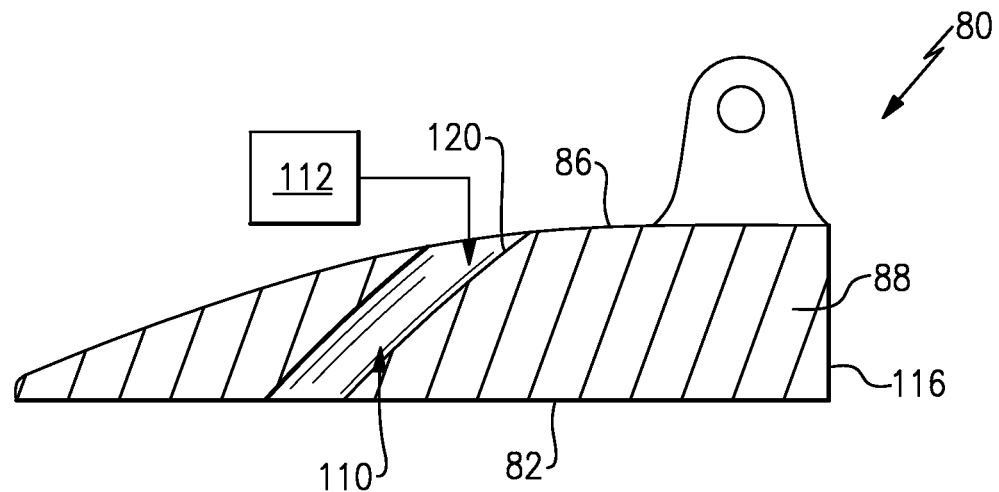
FIG. 6 shows a section view of one of the variable area outer air seals of FIG. 4.

Referring to FIGS. 5 and 6 with continuing reference to FIGS. 2 to 4, adjacent ones of the segments 80 are moveable to shiplapped positions. When shiplapped, portions of circumferentially adjacent segments 80 overlap each other. The flight controller 104 may direct the actuator 74 to adjust rod 76 to move circumferentially adjacent segments 80' and 80" (FIGS. 4 and 5) between the less shiplapped position of FIG. 4 and the more shiplapped position of FIG. 5. In some examples, the actuator 74 may be configured to move the circumferentially adjacent segments 80' and 80" to positions where no portion of circumferentially adjacent segments 80' and 80" overlap.

The example segments 80' and 80" include channels 110 extending from the inclined surface 86 to a radially inward facing surface 82. The channels 110 deliver a fluid, such as cooling air from a supply 112 to an interface between the radially inward facing surface 82 and the blade tip 68. The supply 112 is radially outside the segments 80' and 80" in this example.

The flight controller 104 may direct the actuator 74 to adjust rod 76 in order to regulate flow of fluid through the channels 110. The fluid cools the interface. The flow is regulated by selectively blocking flow entering an inlet 120 of the channels 110. For example, the segment 80' is used to selectively block the flow through channels 110 in the segment 80".

The segment 80' blocks flow through the channels 110 in the segment 80" by covering some or all of the inlets 120 in the segment 80". In this example, in circumferential Region R, increasing the circumferential overlap between the segments 80' and 80" increases the amount of blocked flow and reduces the amount of flow moving through channels 110. The amount of blocked flow may thus be controlled by varying the amount of overlap between the segment 80 and the inlets 120.

The example channels 110 are shown as being entirely within a single one of the segments 80' or 80". In other examples, the channels 110 may be defined partially by one of the segments 80' or 80", such as if the channels 110 were notches in a side of one of the segments 80' and 80".

Figure 7:
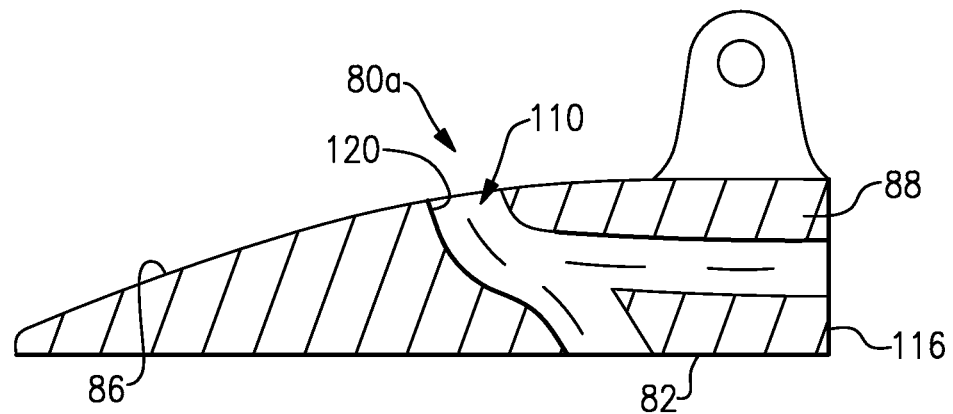
FIG. 7 shows a section view another example variable area outer air seal.

The example channels 110 deliver fluid to the radially inward facing surfaces 82 interacting with the blade tip 68. In other examples, the channels 110 may instead, or in addition to, deliver fluid to other areas, such as to a circumferentially facing surface 116 of the segments 80 (FIG. 7). The size, angles, and positions of the channels 110 are adjustable according to specific cycle requirements, method or control, etc.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

I claim:

1. A turbomachine system, comprising: a first variable outer air seal including at least one channel and being configured to selectively communicate a flow of fluid in response to movement of a second variable outer air seal relative to the first variable outer air seal, wherein the at least one channel has an inlet, and the second variable outer air seal moves relative to the inlet between positions that permit flow through the inlet and positions that limit flow through the inlet to selectively communicate flow.

2. The turbomachine system of claim 1, wherein the at least one channel extends from a radially outward facing surface to a radially inward facing surface.

3. The turbomachine system of claim 1, wherein the at least one channel extends to a circumferentially facing surface.

4. The turbomachine system of claim 1, wherein the first and second variable outer air seals are circumferentially adjacent.

5. The turbomachine system of claim 1, wherein the first variable outer air seal includes an inclined surface, and the second variable outer air seal moves across the inclined surface to selectively communicate fluid.

6. The turbomachine system of claim 1, wherein the first and second variable outer air seals have a shiplapped configuration.

7. The turbomachine system of claim 1, wherein the first and second variable outer air seals are moveable relative to each other between a first position and a second position to selectively control fluid flow through at least one channel, wherein the first and second variable outer air seals circumferentially overlap each other when in the first position more than when in the second position.

8. The turbomachine system of claim 1, wherein the fluid is cooling air.

9. The turbomachine system of claim 1, wherein the first and second variable outer air seals are blade outer air seals.

10. A turbomachine fluid control method, comprising: selectively covering at least one channel of a first variable outer air seal with relative movement of a second variable outer air seal to control a flow of fluid through the at least one channel, wherein the at least one channel has an inlet, and the second variable outer air seal moves relative to the inlet between positions that permit flow through the inlet and positions that limit flow through the inlet to selectively communicate flow.

11. The method of claim 10, wherein the at least one channel is a cooling channel.

12. A turbomachine fluid control method, comprising: moving a first variable outer air seal relative to a second variable outer air seal to control flow of a cooling fluid, wherein the first variable outer air seal includes at least one channel and is configured to selectively communicate fluid in response to relative movement of the second variable outer air seal, wherein the at least one channel has an inlet, and the second variable outer air seal moves relative to the inlet between positions that permit flow through the inlet and positions that limit flow through the inlet to selectively communicate flow.

13. The turbomachine fluid control method of claim 12, wherein the moving comprises moving the first and second variable outer air seals circumferentially relative to each other.

* * * * *